M. J. OWENS.
GLASS GATHERING AND BLOWING MACHINE.
APPLICATION FILED OCT. 26, 1914.

1,322,726. Patented Nov. 25, 1919.
4 SHEETS—SHEET 1

M. J. OWENS.
GLASS GATHERING AND BLOWING MACHINE.
APPLICATION FILED OCT. 26, 1914.

1,322,726.

Patented Nov. 25, 1919.
4 SHEETS—SHEET 2.

Inventor
Michael J. Owens

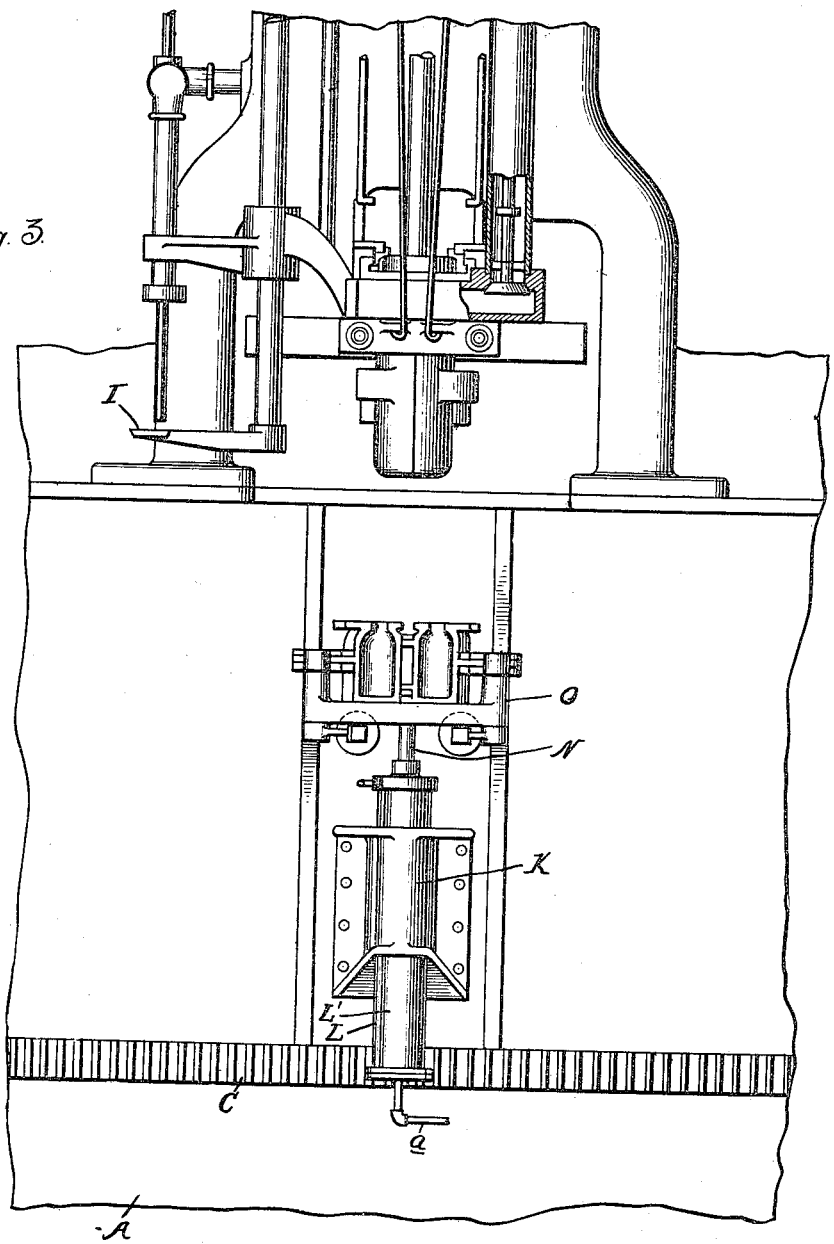

UNITED STATES PATENT OFFICE.

MICHAEL J. OWENS, OF TOLEDO, OHIO, ASSIGNOR TO THE TOLEDO GLASS COMPANY, OF TOLEDO, OHIO, A CORPORATION OF OHIO.

GLASS GATHERING AND BLOWING MACHINE.

1,322,726.

Specification of Letters Patent. Patented Nov. 25, 1919.

Application filed October 26, 1914. Serial No. 868,730.

*To all whom it may concern:*

Be it known that I, MICHAEL J. OWENS, a citizen of the United States of America, residing at Toledo, in the county of Lucas and State of Ohio, have invented certain new and useful Improvements in Glass Gathering and Blowing Machines, of which the following is a specification, reference being had therein to the accompanying drawings.

The invention relates to improvements in a glass gathering and blowing machine and consists in a steadying device for the blank, in the construction of such steadying device applied as a bottom for the blank-mold, in the construction of the operating device for the steadying device and also in the construction of the blow-mold and the operating device therefor; all as hereinafter more particularly set forth and pointed out in the claims.

In the drawings:

Fig. 3 is a front elevation showing the parts in the position of the full lines in Fig. 1;

Fig. 4 is a plan view, partly in section, of the blow-mold slide; and

Figure 1:
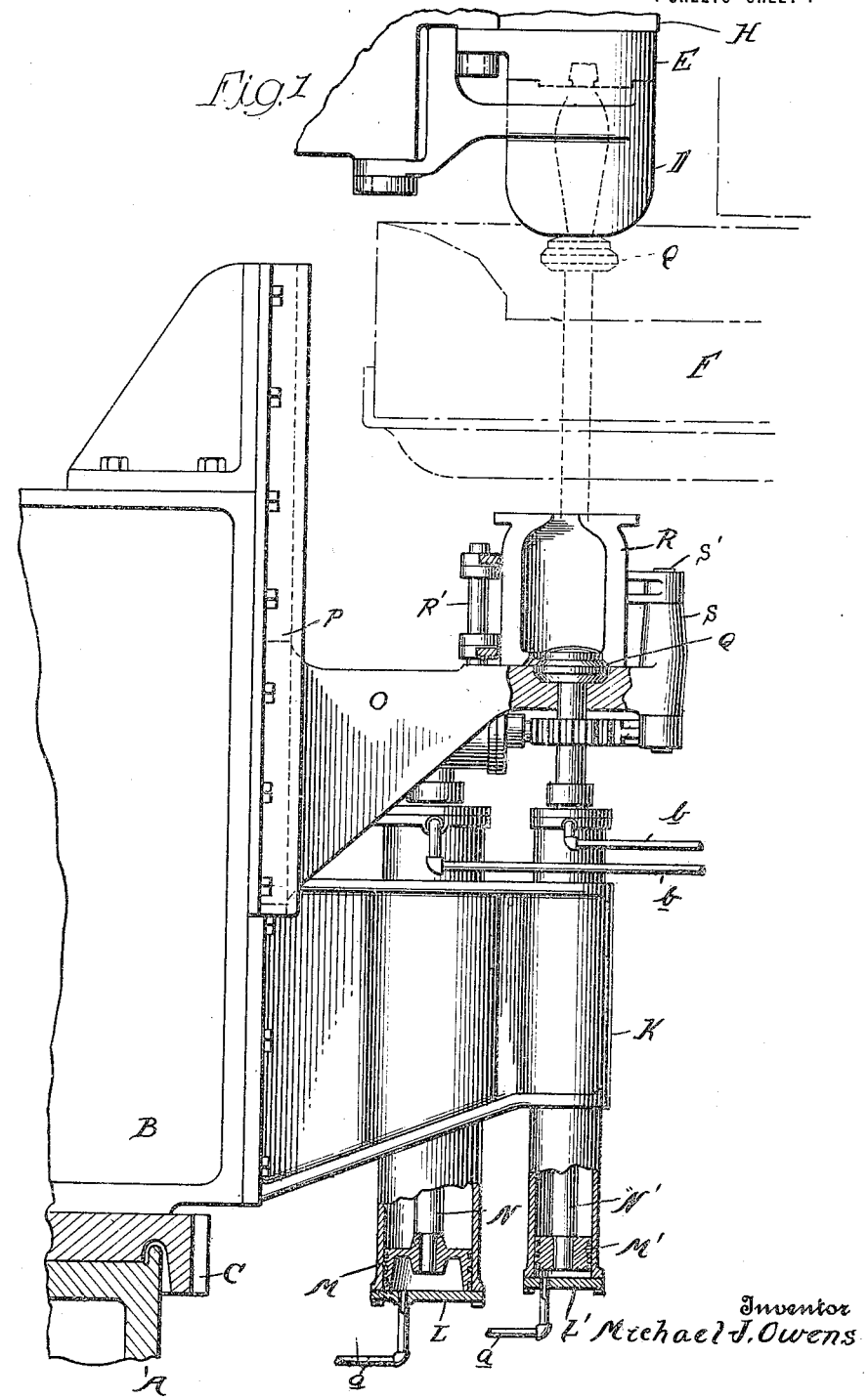
Figure 1 is a side elevation of my improved device, with parts broken away, showing in full lines the position of the blank-mold, blow-mold and steadying-device for the bottom, during the charging of the blank-mold, and showing in dotted lines the position of the steadying device after the blank-mold is charged.
Figure 2:
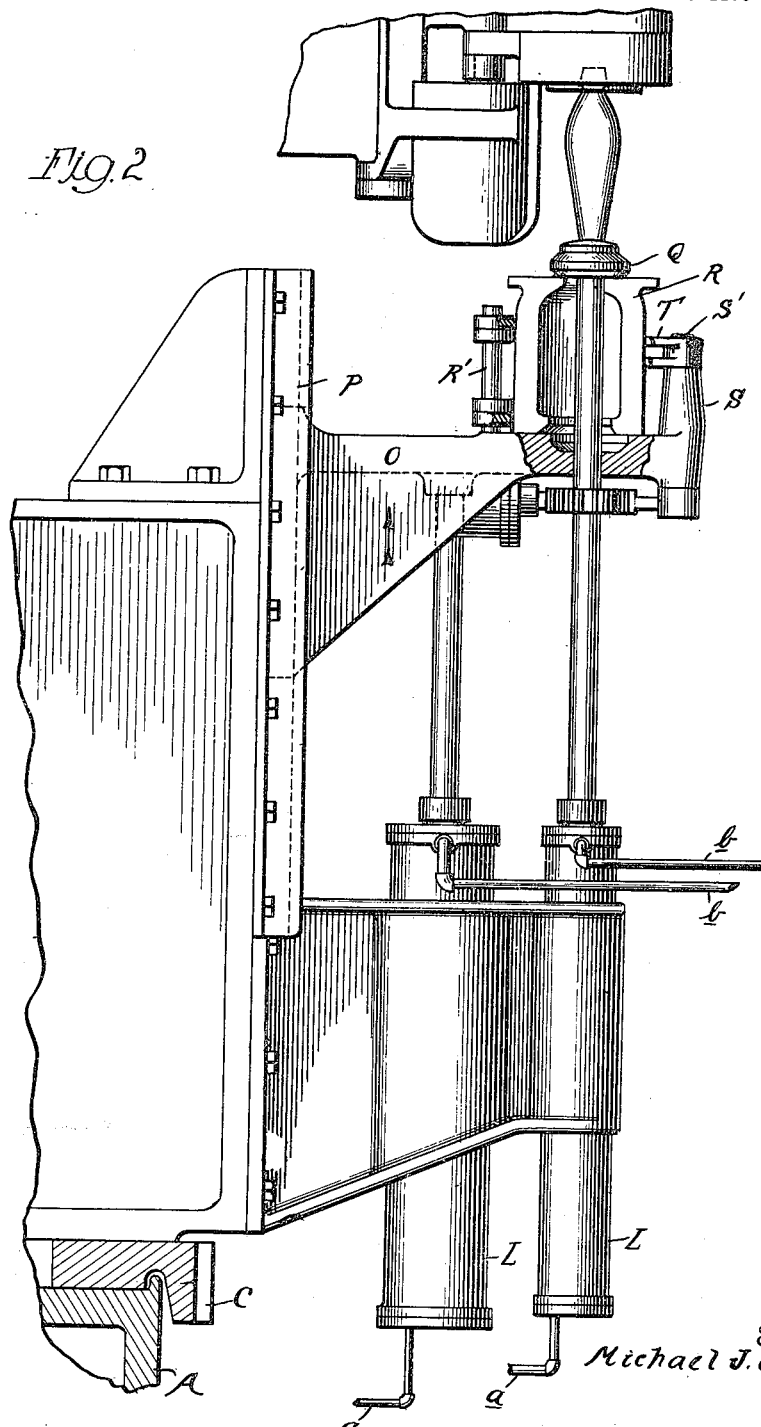
Fig. 2 is an elevation similar to Fig. 1, showing the blank-mold open, the blank suspended from the neck-mold, and the blow-molds moved partly toward their upper position.

Figs. 5 to 11, inclusive, are sectional views, more or less diagrammatic, showing the various positions of the parts during the filling of the blank-mold, the cutting-off of the glass, the blowing of the blank, the shifting of the molds, the blowing of the article and the opening of the molds for discharging.

This invention is designed as an improvement to the so-called "Owens" bottle machine, which, as ordinarily constructed, consists of a rotary traveling frame carrying a series of blank-molds successively into operative relation with a pool of glass, whereby the blank-mold is charged through an opening in the lower end by a differential pressure or vacuum; the glass in the blank is then severed from the glass in the tank, to which it is connected by a string or neck; the blank is blown in the blank mold; the knife withdrawn and the lower part of the blank-mold opened, leaving the blank suspended from the neck-mold portion of the blank-mold; the blow-mold incloses the blank, the blank is expanded in the blow-mold and the molds opened to discharge the article therefrom. This general type of machine is shown in patent to M. J. Owens No. 766,768, issued August 2, 1904, and the patent to W. E. Bock, No. 870,664, issued November 12, 1907.

This particular mechanism is designed to be applied as an improvement to the Owens bottle machine shown in the patent to La France, 1,185,687, June 6, 1916, for which this present construction is particularly designed to be applied.

I have shown in Fig. 3 a portion of the upper portion of the revolving frame which carries the blank-molds and cut-off, but I have not deemed it necessary to show herein those parts which actuate the sections of the blank-mold and neck-mold, the cut-off and the air and vacuum valves, as those parts are well-known in the art at the present time and form no part of my present invention.

A represents the base of the machine, upon which is supported my rotary frame, B. I have shown at C a circular rack to which may be applied the drive pinion for causing the frame B to turn about its central axis upon the base A. D indicates the body portion of the blank-mold and E the neck-mold or neck portion thereof; both being made in two separable halves and having means (not shown) for opening and closing the same, which may be of the usual construction. F represents the tank for the molten glass, to which the lower end of the blank-mold is dipped, at which time a vacuum is produced therein by suitable valve connections, so as to suck the blank into the mold, as shown in Fig. 5. G represents a core or plunger in the upper end of the blank-mold, to form the initial blow-opening in the blank. H is the blow-head below which the blank-mold and neck-mold sections are supported. I is the knife supported at the lower end of the vertical rock-shaft J, for cutting off the string or neck of glass which is lifted from the molten mass in the tank as the blank-mold lifts therefrom, as shown in Fig. 6. Heretofore, in the manufacture of the Owens bottle machine, the knife has been retained beneath the bottom of the blank during the blowing of the blank, but in this machine, as soon as the cut-off has been effected, the knife is immediately withdrawn, leaving the opening in the lower end of the blank-mold exposed.

Below the blank-mold and secured to the rotary frame B is a laterally extending bracket, K, to which are secured the cylinders L L′, each having a piston, M, M′, to which are connected the piston rods N N′, extending through suitable stuffing boxes in the upper end. The upper end of the piston rod N is connected to the blow-mold slide, O, in the top of a bracket, slidably connected by suitable guides, P, with the front of the frame B. The upper end of the piston rod N′ has formed upon it a suitable shaped bottom-plate Q. This plate is shaped according to the particular article which is to be made in the machine; in this case it is shown as convex to make the concave bottom portion of a bottle.

Upon the blow-mold slide O are hinged blow-mold sections R pivoted upon the pins R′. At the outer end of the blow-mold slide O are vertical journals, S, in which are journaled the shafts S′, each having at its upper end a crank, T, connected by a link, T′, with one of the blow-mold sections. At the lower end and secured to each of the shafts S′ S′ are the gear segments, U, meshing with rack-bars, U′, which in turn are each connected to the piston, V, in horizontally-arranged cylinders, V′, in the blow-mold slide O.

Suitable air connections, $a$ $b$, at the top and bottom of the cylinders L L′, controlled by cams on the stationary frame about which the frame B rotates, in the well-known manner of applying such cams in the Owens machine (such cams not being here shown), control the inlet and exhaust of the air above and below the pistons. Suitable air pipes $c$ $c'$ also connect into the cylinders V′ and are controlled by suitable cams (not shown) which are arranged to give the proper timing effect to the movement of the parts to be hereinafter described.

The parts being thus constructed, their operation is as follows:

In the filling of the blank-mold the parts are in the position shown in Fig. 1 and a part of the blank-mold is shown in position for gathering the glass and filling the same. When the blank-mold is filled, as shown in Fig. 5, it is lifted during the travel of the machine above the surface of the glass, as shown in Fig. 6, and the cut-off knife severs the neck of glass in the well-known manner and is withdrawn and lifted to the position shown at the left-hand of Fig. 3. The blank-mold, as is well-known, has a continuous traveling movement, and as it passes beyond the tank air is admitted to the bottom of the cylinder L′ and the piston M′ is lifted, carrying with it the bottom-plate Q, which lifts said bottom-plate against the bottom of the blank-mold, as shown in Fig. 7 and in dotted lines in Fig. 1. The plunger G having been withdrawn, air is admitted under pressure and the blank is blown in the blank-mold.

The bottom-plate Q remains in position and the lower or body portion D of the blank-mold is opened, leaving the blank suspended from the neck-mold E, while its lower end is supported and steadied by the bottom-plate Q, as shown in Fig. 8. As the body blank-mold sections open, air is admitted beneath the piston M and the blow-mold slide O is raised, carrying with it the blow-mold and the operating devices therefor, until the blow-mold sections are in contact with the underside of the neck-mold E, as shown in Fig. 9.

Air is then admitted to the pipes $c$ behind the pistons V and the racks U′ are pushed outward, rocking the gear segments U, the shafts S′, crank arms T and links T′, and closing the blow-mold about the lower portion of the blank, to the position shown in Fig. 10.

Air is then admitted into the top of the blank and it is expanded into the finished article, as shown in Fig. 10.

The neck-mold sections and blow-mold sections are then opened, as shown in Fig. 11, by a reverse movement of the pistons V′ and by suitable operating devices for the neck-molds (not shown), and the bottle discharged.

To lower the blow-mold slide O and the bottom-plate Q, air is admitted at the upper end of the cylinders L L′ through the pipes $b$, and the parts are returned to their initial position (Fig. 1), ready for another operation.

By the use of this bottom-plate for the blank the scar produced by retaining the knife in position as heretofore done is entirely or nearly eliminated. By retaining the bottom-plate in contact with the lower end of the blank during the time that the blank-molds are opening and the blow-molds inclosing the blank, the swinging of the blank due to the vibration caused by the travel of the machine is entirely eliminated and the possibility of the blank standing at an angle in the blow-mold, which would cause a defective or inferior bottle, is eliminated.

The use of the vertically rising blow-mold is a more simple and rapidly operating device for the blow-mold than has heretofore been used, enabling the machine to be speeded up so that more bottles per minute will be produced than by such machines heretofore used. The devices are also able to operate with less wear than with the devices in which the molds are raised and lowered by running upon cam-ways. The blow-mold being held against the neck-mold by air pressure maintains a tight joint without danger of leakage, and eliminates the necessity of springs heretofore employed for this purpose. By the use of the air to close the blow-molds the use of springs is obviated as there is an air-cushion in case particles of glass should get between the mold sections, and thus the danger of breakage of the blow-molds or operating parts is greatly reduced.

What I claim as my invention is:

1. In a glass gathering machine, the combination of a gathering mold, a bottom therefor in alinement with the mold during the gathering operation, means for moving the bottom into position to close the gathering mold, means for opening the gathering mold with the bottom remaining in position and a sectional blowing mold adapted to close about the blank and bottom.

2. In a glass gathering machine, the combination of an opening and closing sectional blank mold, means for filling it with glass through the open end, a bottom for the fill opening in alinement therewith during the filling of the mold, means for moving the bottom to position on the filled blank mold and maintaining the bottom in position against the lower end of the blank during the opening of the blank mold.

3. The combination of a blank mold comprising a neck and sectional body-blank section, a blowing mold adapted to inclose the body of the blank, and a bottom permanently in alinement with the blank mold and adapted to engage the blank while in the blank mold to steady the same during the opening of the body-blank mold and the closing of the blowing mold.

4. The combination of a traveling blank mold comprising a neck and sectional body blank section and a sectional blowing mold, of a bottom permanently in alinement with the blank mold and adapted to engage the bottom of the blank in the blank-mold and to remain in engagement therewith during the transfer from the blank-mold to the blowing mold.

5. In a bottle blowing machine of the "Owens" type, the combination of a gathering blank-mold and a blow-mold traveling in unison, a bottom traveling with the molds and permanently in vertical alinement with the blank mold and means for raising it to close the gathering opening in the blank-mold after the blank is formed therein and remaining in position during the opening of the body-blank mold, the closing of the blow-mold and the blowing of the bottle.

6. In a glass gathering machine, the combination of a neck-mold and a sectional body-blank mold having an open lower end, a sectional blow-mold adapted to inclose that portion of the blank inclosed by the body-blank mold, and a bottom common to and continuously in vertical alinement with both molds.

7. The combination of a blank-mold comprising a neck-mold and a sectional body-blank mold, a blowing mold adapted to inclose the body of the blank, the blank-mold and blow-mold being relatively movable vertically to position the blow-mold for closing on the blank, means for opening the body blank mold, and a support for engaging the blank before the body blank mold opens and steadying the blank while it is suspended by the neck-mold and the blowing-mold is closing thereon.

8. The combination of a blank-mold comprising a neck and body blank section, a blowing mold adapted to inclose the body of the blank, and a bottom for the body blank mold adapted to engage the blank to steady the same during the opening of the body-blank mold, the blowing-mold being movable vertically into position to surround the blank while the latter is engaged by said bottom.

9. In a glass gathering and blowing machine, the combination of means for gathering and shaping the glass blank from molten glass, of a length of the finished bottle, means for supporting the blank at opposite ends while transferring it from the blank-forming means to the means in which it is blown, and means for blowing the blank, said supporting means and the means in which the blank is blown being relatively movable in a direction lengthwise of the blank to position said last mentioned means to surround the blank.

10. In a glass gathering and blowing machine, the combination of a blank-mold having a gathering opening, a cut-off adapted to move across the opening and withdraw and a bottom beneath the cut-off while the latter is in operative position and movable upward to cover the cut off opening after the cut-off is withdrawn.

11. In a glass gathering machine, a traveling blank-mold having a neck-mold, a blow-mold traveling therewith and in vertical alinement below the same, means for opening the blank-mold to leave the blank suspended from the neck-mold, means for closing the blank mold and for supporting the blank when released, and means for moving the blow-mold upward to inclose the blank and to close the blow-mold about the blank.

12. The combination of the blank-mold having an open bottom, a bottom-plate supported below the blank-mold, means for raising the bottom-plate against the blank-mold to cover the bottom opening, a sliding bracket below the blank-mold, blow-mold sections hinged to the bracket, means for raising and lowering the bracket and means for opening and closing the blow-mold sections.

13. The combination of the blank-mold having an open bottom, a bottom-plate supported below and for closing the blank-mold, a piston rod connected to the bottom-plate, a piston thereon and a cylinder having suitable air connections for reciprocating the bottom-plate into and out of position to close said bottom opening.

14. In a bottle-blowing machine of the "Owens" type, the combination with the rotary frame, the blank-mold and its operating mechanism thereon, of a bracket projecting from the frame below the blank-mold and sliding in guides thereon, means for reciprocating the bracket, blow-mold sections pivoted to said bracket, and pneumatic means carried by said bracket for opening and closing the blow-mold sections.

15. In a machine of the kind described, the combination with a frame having vertical guides of a blow-mold supporting bracket sliding in said guides, means for raising and lowering the bracket, mold sections hinged to said bracket, a plurality of air cylinders secured to the bracket to swing about a vertical axis, pistons therein, and separate actuating connections from the pistons to the respective blow-mold sections for opening and closing the mold sections.

16. In a glass blowing machine, the combination with a blank mold having an open charging end, means for severing the charge from the batch of molten glass, and means acting automatically for closing the charging opening independent of the severing means.

17. In a glass blowing machine, the combination with a blank mold having a charging opening therein, a closure for the opening after the charge has been received into the mold, a blowing mold and means for removing the blank mold from the charge and applying the blowing mold to the charge while retaining the closure in contact with the charge.

18. In a glass gathering machine, the combination with a blank mold having an open charging end, of a blowing mold, a combined closing device for the blank mold and supporting device for the blank, means for moving the closing and supporting device toward and from the mold, and means for removing the blank mold from the charge and surrounding the same by the blowing mold.

19. In a glass gathering machine, the combination with a blank mold, means for sucking glass thereinto, and means to sever the glass in the mold from the batch, of a closure for the open end of the mold, and means for positively and independently moving the closure toward and from the mold.

20. In a glass gathering machine, a blank mold having a charging opening from which the batch is severed, and a reciprocating closure for the mold independent of the batch severing means.

21. In a glass gathering means of the character described, means for closing the charging end of a blank mold and pneumatic means for causing said closure to move toward and from the blank mold.

22. In a glass gathering machine, in combination with a blank mold having a charging opening, of a closure and bottom former for the charging end of the mold, a piston, and means for operating the piston to move the closure toward and from the mold.

23. In a glass gathering machine, the combination with a rotary blank mold having a charging opening, means for severing the charge from the batch, and means operable upon the severance of the charge for closing the charging opening of the mold.

24. In a glass gathering machine, the combination with a tank from which the machine is adapted to gather the glass, of a blank-mold traveling above the tank, a closure for the charging opening of the blank-mold normally traveling below the tank and means for raising the closure to close the charging opening.

25. The combination with a glass tank, of a glass gathering machine having traveling blank and blow molds separated vertically to pass respectively above and below the tank and pneumatic means for relatively moving the molds toward each other to bring the blank to the same elevation as the blow mold, and means forming a bottom support for the blank during said relative movement of the molds.

26. The combination with a glass tank, of a glass gathering machine having traveling blank and blow molds separated vertically to pass above and below the tank, and means for relatively moving the blank and blow molds vertically, and a bottom support for the blank movable vertically in advance of said movement of the molds for the purpose described.

27. In a glass gathering machine the combination of a blank mold having a bottom charging opening, a closure therefor traveling in the same vertical plane below the blank mold and means for raising and lowering the closure to and from the blank mold.

28. In a glass gathering machine the combination of a blank mold, means for charging it with glass through its open end, a blow mold traveling vertically below the blank mold on a lower plane, a bracket carrying said blow mold, and means for vertically reciprocating the bracket to bring the blow mold into horizontal register with the blank mold, and means forming a bottom support for the blank during the upward movement of the blow mold.

29. In a glass gathering machine the combination of a rigid traveling frame, gathering mold sections pivoted thereto, a bottom for the gathering mold, means for moving the bottom into position to close the gathering mold, means for opening the gathering mold sections, leaving the bottom in position, and a sectional blow mold adapted to close about the blank and bottom.

30. The combination of a blank mold and a blowing mold, means to open and close each of said molds, and means to impart to said molds a relative straight line vertical movement of translation by which the blowing mold is brought into position to be closed on the blank, said movement of translation and said opening and closing movements being so coördinated that the blank is retained in one or the other of said molds during the movement of translation.

31. In a glass gathering and forming machine, the combination of a blank mold and a finishing mold arranged one above the other, a bottom therefor, and means for bringing said bottom into coöperative relation with said molds alternately by relative vertical movement of the bottom and molds.

32. In a glass gathering and forming machine, the combination of a blank mold, a finishing mold, a bottom therefor, means for bringing said bottom into coöperative relation with said molds alternately by relatively vertical movement of the bottom and molds, and means to bring the finishing mold into position to receive the blank by a relative vertical movement of the molds.

33. In a glass gathering machine, the combination with a glass tank, of a traveling blank mold and a traveling blank support arranged to pass respectively above and below the tank, and means to effect a relative vertical movement of the mold and said support, after they have passed beyond the tank, and thereby bring the support into position to engage the bottom of a blank formed in said mold.

34. In a glass gathering machine, the combination with a glass tank of a traveling blank mold and a traveling blank support, arranged to pass respectively above and below the tank, and a pneumatic device operative to move said support vertically upward after the mold and said support have passed beyond the tank and thereby bring the support into position to engage the bottom of a blank formed in said mold.

35. In a glass gathering machine, the combination with a glass tank of a traveling carrier, a blank mold and support on said carrier in vertical alinement and arranged to travel respectively above and below the tank, means for charging the mold as it passes over the tank, said mold comprising a body portion and a neck portion, means for opening the body portion, and means for moving said support upward to engage the bottom of the blank, whereby the blank is supported by said neck portion and said support.

36. In a glass gathering machine, the combination with a glass tank of a traveling carrier, a blank mold and support on said carrier in vertical alinement and arranged to travel respectively above and below the tank, means for charging the mold as it passes over the tank, said mold comprising a body portion and a neck portion, means for opening the body portion, and means for moving said support upward to engage the bottom of the blank, whereby the blank is supported by said neck portion and said support, a blow mold, and means for closing it around the blank, said support forming a closure for the bottom of the blow mold.

37. In a glass gathering and forming machine, the combination with a traveling carrier, of a blank mold carried thereby, a supporting frame or bracket mounted for vertical movement on said carrier, a blow mold on said frame, said frame being positioned to pass beneath a glass tank while the blank mold gathers a charge therefrom, means to move said frame vertically to bring the blow mold up to the blank, and means forming a bottom support for the blank during said movement of the frame.

38. In a glass gathering and forming machine, the combination with a traveling carrier of a blank mold carried thereby, a supporting frame or bracket mounted for vertical movement on said carrier, a blow mold on said frame, said frame being positioned to pass beneath a glass tank while the blank mold gathers a charge therefrom, means to move said frame vertically to bring the blow mold up to the blank, a bottom for the blow mold, and means to move said bottom upward in advance of the blow mold into position to engage and support the blank while the latter is being transferred from the blank mold to the blow mold.

39. In a glass gathering and forming machine, the combination with a traveling carrier of a blank mold carried thereby, a supporting frame or bracket mounted for vertical movement on said carrier, a blow mold on said frame, said frame being positioned to pass beneath a glass tank while the blank mold gathers a charge therefrom, means to move said frame vertically to bring the blow mold up to the blank, a pneumatic motor mounted on said carrier beneath the molds, said motor comprising a vertical cylinder, a piston, and a piston rod, a bottom plate for the blow mold mounted on the piston rod, said motor operable to move said bottom plate upward in advance of the blow mold into position to engage and support the blank while the latter is being transferred from the blank mold to the blow mold.

In testimony whereof I affix my signature in presence of two witnesses.

MICHAEL J. OWENS.

Witnesses:
 T. H. MILLER,
 S. E. EICHMAN.